United States Patent [19]

Russnak

[11] Patent Number: 4,577,965

[45] Date of Patent: Mar. 25, 1986

[54] WEAPON SYSTEM TRANSPORTER

[75] Inventor: Clarence J. Russnak, Huntsville, Ala.

[73] Assignee: The Boeing Company, Seattle, Wash.

[21] Appl. No.: 537,853

[22] Filed: Sep. 30, 1983

[51] Int. Cl.⁴ .............................................. G01B 11/00
[52] U.S. Cl. .................................... 356/138; 356/399
[58] Field of Search ...................... 356/138, 152, 399;
33/286; 414/401, 584

[56] References Cited

U.S. PATENT DOCUMENTS

| 3,261,484 | 7/1966 | Nilsson | 414/401 |
| 3,261,650 | 7/1966 | Stromqvist | 414/401 X |
| 3,974,737 | 8/1976 | Georgel et al. | 414/584 |

Primary Examiner—F. L. Evans
Attorney, Agent, or Firm—Edwin H. Crabtree

[57] ABSTRACT

A weapon system transporter for carrying a unit under test and enabling rapid and accurate alignment between a test collimator and the unit under test.

7 Claims, 5 Drawing Figures

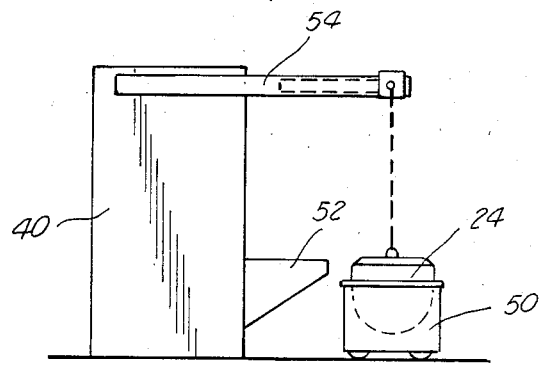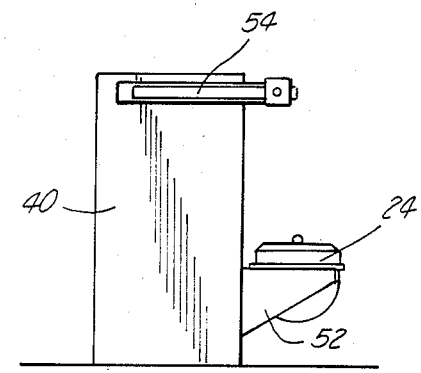
FIG. 2 PRIOR ART        FIG. 3 PRIOR ART
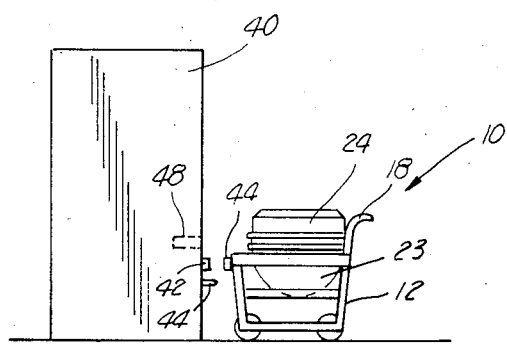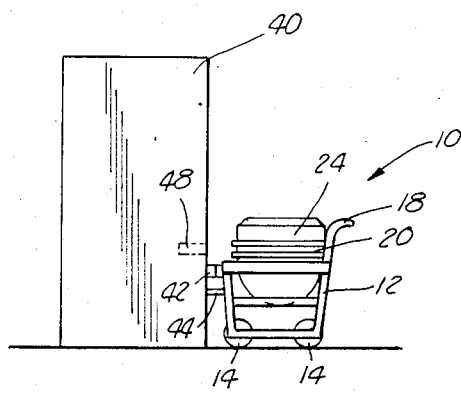
FIG. 4        FIG. 5

WEAPON SYSTEM TRANSPORTER

BACKGROUND OF THE INVENTION

This invention relates to the testing of a unit under test used with an aircraft and the like, and more particularly, but not by way of limitation, to a weapon system transporter for receiving a unit under test from an aircraft and transporting the unit under test to a test collimator for rapid and accurate alignment between the collimator and the unit under test.

Heretofore, a unit under test was transported from an aircraft to a test area. At the test area the unit under test was hoisted on a mobile maintenance stand. The unit under test and the stand were then transported to a test collimator and hoisted on collimator support arms. The hoist was mounted on top of the collimator. The collimator support arms often deflected proportionately to the weight of the unit under test causing bore sight error in the pitch axis.

In U.S. Pat. No. 3,470,377 to Le Febre et al, U.S. Pat. No. 3,734,627 to Edwards, and U.S. Pat. No. 4,191,471 to Courten et al, various types of bore sight kits, armament alignment devices, and autocollimators are disclosed. None of these prior art patents particularly point out the unique features and advantages of the subject weapon system transporter as described herein.

SUMMARY OF THE INVENTION

The subject invention eliminates the use of a collimator hoist, collimator support arms, and provides accurate alignment data.

Further, the weapon system transporter enables accurate and rapid alignment of the unit under test with the test collimator.

The transporter utilizes a reference mirror which is perpendicular to the optical axis or axes of the unit under test. Automatic autocollimators mounted on the test collimator track the reference mirror and enable instantaneous position readout in the azimuth and pitch axis of the unit under test.

The weapon system transporter for receiving a unit under test thereon and adapted for releasable engagement to the test collimator includes a frame having wheels mounted thereon. A frame housing is pivotally mounted on top of the frame and adapted for receiving the unit under test. Mounted on the frame housing is a pair of magnetic pads which engage a pair of electromagnets mounted in front of the test collimator. Also mounted on the frame housing is an alignment mirror aligned with the axis of the unit under test for reflection of a signal from an orthogonal autocollimator in the test collimator.

The advantages and objects of the invention will become evident from the following detailed description of the drawings when read in connection with the accompanying drawing which illustrate preferred embodiments of the invention.

BRIEF DESCRIPTION OF THE DRAWINGS

FIGS. 2 and 3 disclose a prior art maintenance stand with a test collimator having a hoist and support arms.

FIGS. 4 and 5 illustrate the weapon system transporter received in front of and engaged to the test collimator.

DETAILED DESCRIPTION OF THE DRAWINGS

Figure 1:
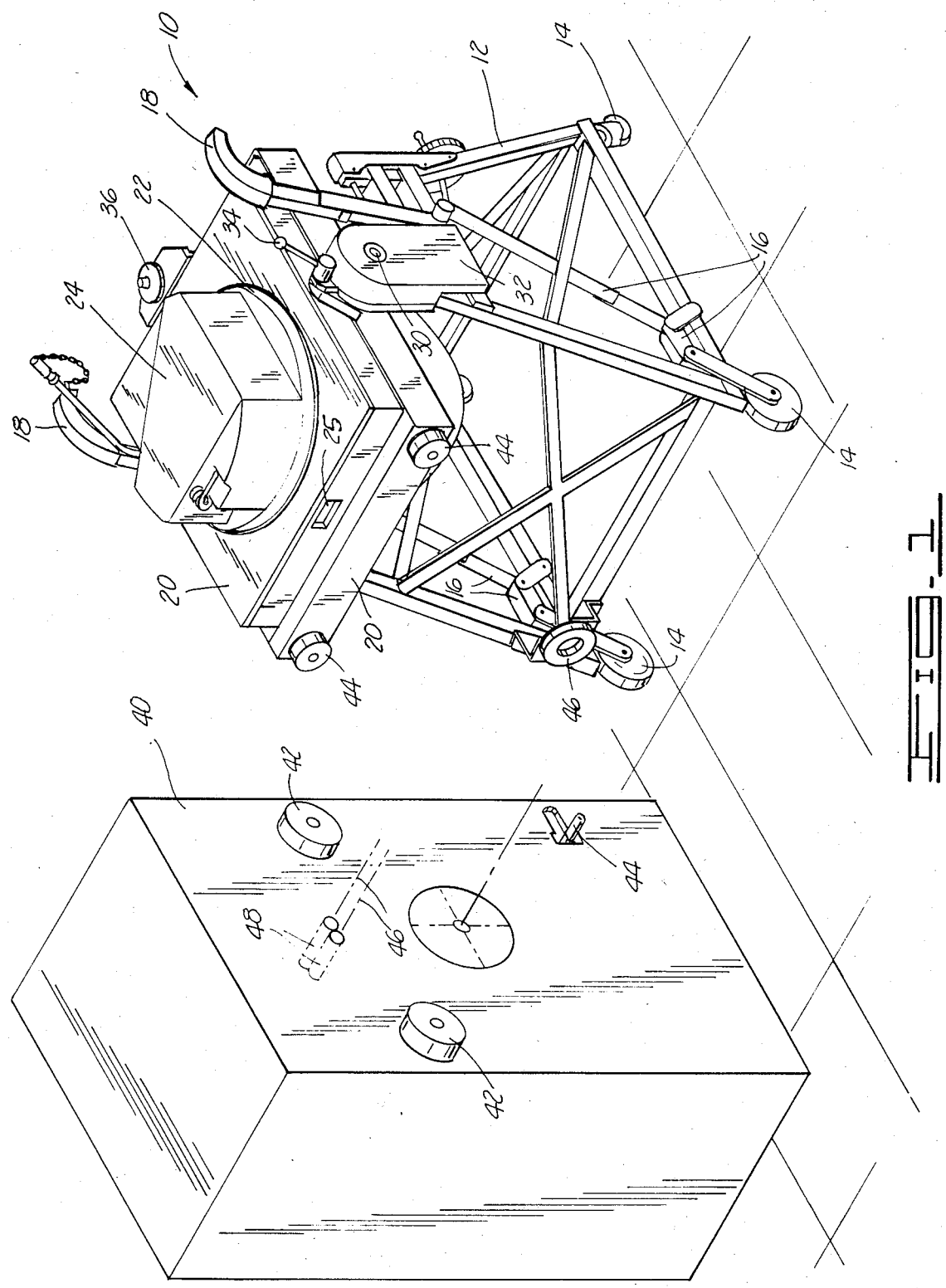
FIG. 1 is a perspective view of a unit under test received on the weapon system transporter. The transporter is shown in front of a test collimator.

In FIG. 1 the weapon system transporter is designated by general reference numeral 10. The transporter 10 includes a frame 12 having a plurality of wheels 14 mounted thereon. The frame 12 further includes a brake system 16 connected to a pair of handles 18. By releasing the handles 18 the brake system 16 automatically locks the wheels 14 to the frame 12 preventing movement of the transporter 10. Mounted on top of the frame 12 is a frame housing 20 having an annular hole 22 in the top thereof. The hole 22 allows a unit under test 24 to be mounted on frame housing 20. The unit under test 24 may include a reference mirror mounted thereon which is perpendicular to the optical axis of the unit under test 24. When the unit under test 24 does not include a reference mirror, a reference mirror 25 is mounted on the front of the frame housing 20 and is properly aligned perpendicular to the optical axis of the unit under test 24.

The unit under test 24 may have various types of geometric design and may be secured to the frame housing 20 by other means as long as the axis of the unit under test 24 is properly aligned and perpendicular to the plane of the reference mirror 25.

The frame housing 20 is secured to the frame 12 by a pivot shaft 30 which is received in a shaft housing 32 and secured thereto by a locking handle 34. By releasing the locking handle 34 the housing 20 may be rotated about the shaft 30 for access to the under side of the unit under test for non optical testing of the unit under test 24.

An adjustment screw 34 will allow a small pitch adjustment (rotation) of the unit under test 24 and housing 20 when the transporter is coupled to the collimator 40 to zero adjust the pitch axis reading, if desired.

Shown in front of the test collimator 40 is a pair of electromagnets 42 which when energized engage a pair of magnetic pads 44 mounted in front of the frame housing 20. The electromagnets 42 may or may not be adjustable to allow for adjusting the housing frame 20 and unit under test 24 in front of the collimator 40. Also for rapid alignment of the unit under test 24 and the transporter 10 a tapered locating pin 44 is shown extending outwardly from the collimator 40 for receipt inside a locating socket 46 attached to the front of the frame 12.

Also shown in front of the test collimator 40 is a reflection signal indicated by dashed lines 46 sent outwardly from a pair of orthogonal autocollimators 48. The autocollimators 48 are used for transmitting the reflection signal 46 which is reflected off the alignment mirror 24 for providing constant tracking of the azimuth and pitch readings of the unit under test optical axis with respect to the optical axis of the test collimator 40. Digital outputs of the automatic autocollimators 48 continuously monitor the unit under test optical axis and may input this positional information to a computer mounted in the test collimator 40 if desired.

In FIGS. 2 and 3 the test collimator 40 is shown with a prior art maintenance stand 50 carrying the unit under test 24. In the past the stand 50 wheeled the unit under test 24 in front of the collimaotr 40 having support arms 52 extending outwardly therefrom. Mounted on top of the collimator was a hoist 54 which was used to raise the unit under test 24 upwardly and lower the unit under test 24 on top of the support arms 52. The unit under test 24 as shown in FIG. 3 was then ready for alignment testing. As mentioned above, the collimator support arms 52 deflected proportionately to the weight of the unit under test 24 causing bore sight error in the pitch axis.

In FIGS. 4 and 5 the subject weapon system transporter 10 is shown with the unit under test 24 disposed in front of the collimator 40 with the support arms 52 and hoist 54 removed. The transporter 10 is ready for engagement to the electromagnets 42 and the tapered locating pin 44. The electromagnets 42 and the locating pin 44 of the collimator 40 provide for accurate and rapid releasable engagement of the transporter 10 to the collimator 40 with the orthogonal autocollimators 48 providing a signal to the reference mirror 25 for tracking the aximuth and pitch readings of the unit under test optical axis.

Changes may be made in the construction and arrangement of the parts or elements of the embodiments as described herein without departing from the spirit or scope of the invention defined in the following claims.

What is claimed is:

1. A weapon system transporter for receiving a unit under test thereon and releasable engagement to a test collimator used for testing the electro-optics of the unit under test, the transporter comprising:
    a frame having wheels mounted thereon;
    a frame housing mounted on top of the frame for receiving the unit under test thereon;
    means for engaging the test collimator and holding the collimator to the transporter, the means for engaging mounted on the frame housing; and
    alignment means mounted on the frame housing for aligning the axis of the unit under test with an orthogonal autocollimator in the test collimator.

2. The transporter as described in claim 1 wherein the means for engaging is a pair of metal pads mounted on the housing frame for releasable engagement to a pair of electromagnets, the electromagnets mounted on front of the test collimator.

3. The transporter as described in claim 1 wherein the alignment means is an alignment mirror mounted in front of the frame housing, the alignment mirror aligned with the axis of the unit under test and reflecting a signal from the orthogonal autocollimator for aligning the test collimator with the unit under test.

4. The transporter as described in claim 1 further including a locating socket mounted on the frame, the socket receiving a tapered locating pin extending outwardly from the front of the test collimator.

5. The transporter as described in claim 1 further including pitch adjustment means mounted on the frame housing for raising and lowering the frame housing about a horizontal axis and adjusting the pitch of the unit under test.

6. A weapon system transporter for receiving a unit under test thereon and releasable engagement to a test collimator used for testing the electro-optics of the unit under test, the transporter comprising:
    a frame having wheels mounted thereon;
    a frame housing mounted on top of the frame for receiving the unit under test thereon;
    a pair of magnetic pads mounted on the front of the frame housing, the magnetic pads for releasable engagement with a pair of electromagnets mounted in front of the test collimator; and
    an alignment mirror mounted in front of the frame housing, the alignment mirror aligned with the axis of the unit under test and reflecting a signal from an orthogonal autocollimator mounted in the test collimator.

7. The transporter as described in claim 6 further including a horizontal pivot shaft connected to the frame and the frame housing for allowing the frame housing to pivot about a horizontal axis and a tilt screw connected to the frame and the frame housing, by adjusting the tilt screw the frame housing can be rotated about the axis of the pivot shaft for adjusting the pitch of the unit under test.

* * * * *